United States Patent
Wang et al.

(10) Patent No.: US 11,841,978 B2
(45) Date of Patent: Dec. 12, 2023

(54) PROTECTING ACCESS TO INFORMATION IN ONLINE INTERACTIONS

(71) Applicant: Google LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/765,924

(22) PCT Filed: Apr. 20, 2021

(86) PCT No.: PCT/US2021/028165
§ 371 (c)(1),
(2) Date: Apr. 1, 2022

(87) PCT Pub. No.: WO2022/071993
PCT Pub. Date: Apr. 7, 2022

(65) Prior Publication Data
US 2022/0366084 A1    Nov. 17, 2022

(30) Foreign Application Priority Data

Sep. 29, 2020 (IL) .......................... 277641

(51) Int. Cl.
*G06F 21/62* (2013.01)
*G06F 21/60* (2013.01)
*G06F 21/64* (2013.01)

(52) U.S. Cl.
CPC ........ *G06F 21/6254* (2013.01); *G06F 21/604* (2013.01); *G06F 21/64* (2013.01)

(58) Field of Classification Search
CPC .... G06F 21/6254; G06F 21/604; G06F 21/64; G06F 21/645; G06F 21/6245;
(Continued)

(56) References Cited

U.S. PATENT DOCUMENTS

| 2013/0031167 A1* | 1/2013 | Furukawa | G06Q 30/02 709/203 |
| 2016/0142379 A1* | 5/2016 | Tawakol | H04L 63/0421 726/1 |

(Continued)

FOREIGN PATENT DOCUMENTS

| JP | WO2011-132345 | 10/2011 |
| JP | 2014-056549 | 3/2014 |

(Continued)

OTHER PUBLICATIONS

International Search Report and Written Opinion in International Appln. No. PCT/US2021/028165, dated Jul. 5, 2021, 15 pages.

(Continued)

*Primary Examiner* — Carl G Colin
*Assistant Examiner* — Andrew Suh
(74) *Attorney, Agent, or Firm* — Fish & Richardson P.C.

(57) ABSTRACT

This disclosure relates to preserving the privacy of users and preventing access to information of other entities. In one aspect, a method includes receiving, from a client device, a content request including request signals specifying user group identifiers that each identify a user group that includes a user of the client device. One or more user group identifiers that satisfy a first k-anonymity process are identified. Selection parameter elements that each include data indicating a respective digital component and a selection parameter for the respective digital component are received from one or more first content platforms. At least a portion of the selection parameters and, for each selection parameter, data identifying the first content platform from which the selection parameter was received are transmitted to a second content platform. Data specifying a given first content platform selected based on the selection parameters is received from the second content platform.

20 Claims, 4 Drawing Sheets

(58) Field of Classification Search
CPC ... G06F 21/31; H04L 63/0421; H04L 63/104; H04L 67/535; H04L 63/10; H04W 12/02
See application file for complete search history.

(56) References Cited

U.S. PATENT DOCUMENTS

| | | | |
|---|---|---|---|
| 2016/0171243 A1* | 6/2016 | Maeda | G06F 21/6254 726/27 |
| 2017/0134771 A1 | 5/2017 | Barton | |
| 2020/0007514 A1* | 1/2020 | Li | G06F 21/602 |
| 2020/0252470 A1* | 8/2020 | Gagnon-Kvale | G06Q 10/0639 |
| 2021/0258306 A1* | 8/2021 | Dowd | H04L 41/0813 |

FOREIGN PATENT DOCUMENTS

| | | |
|---|---|---|
| JP | 2016-157394 | 9/2016 |
| JP | 2017-174403 | 9/2017 |

OTHER PUBLICATIONS

Krishnan et al., "The design of an anonymous file sharing system based on group anonymity," Information and Software Technology, Mar. 15, 2004, 46(4) : 273-278.

Office Action in Japanese Appln. No. 2022-525401, dated Jun. 19, 2023, 4 pages (with English translation).

Office Action in Israel Appln. No. 277641, dated May 30, 2023, 4 pages.

Office Action in Indian Appln. No. 202227020273, dated Sep. 12, 2023, 8 pages (with English translation).

Notice of Allowance in Japanese Appln. No. 2022-525401, dated Oct. 10, 2023, 5 pages (with English translation).

* cited by examiner

PROTECTING ACCESS TO INFORMATION IN ONLINE INTERACTIONS

CROSS-REFERENCE TO RELATED APPLICATIONS

This application is a National Stage Application under 35 U.S.C. § 371 and claims the benefit of International Application No. PCT/US2021/028165, filed Apr. 20, 2021, which claims priority to IL Application No. 277641, filed Sep. 29, 2020. The disclosure of the foregoing applications are hereby incorporated by reference in their entirety.

BACKGROUND

This specification relates to data processing and preserving the privacy of users and protecting access to information of other entities when analyzing user data.

K-anonymity techniques are used to ensure that data for each member of a group is anonymous. For data to have the k-anonymity property, the data for a member cannot be distinguished from the data for k−1 other members of the group.

SUMMARY

In general, one innovative aspect of the subject matter described in this specification can be embodied in methods that include receiving, from a client device, a content request comprising a set of request signals specifying user group identifiers that each identify a user group that includes a user of the client device as a member. One or more user group identifiers that satisfy a first k-anonymity process are identified. A selection parameter request comprising at least one or more of the user group identifiers is transmitted to each of one or more first content platforms. Selection parameter elements are received from the one or more first content platforms. Each selection parameter request includes data indicating a respective digital component and a selection parameter for the respective digital component. At least a portion of the selection parameters and, for each selection parameter, data identifying the first content platform from which the selection parameter was received are transmitted to a second content platform. Data specifying a given first content platform selected based on the selection parameters is received from the second content platform. Data indicating the digital component provided by the given first content platform and the selection parameter for the digital component provided by the given first content platform are transmitted to the client device. Other implementations of this aspect include corresponding apparatus, systems, and computer programs, configured to perform the aspects of the methods, encoded on computer storage devices.

These and other implementations can each optionally include one or more of the following features. In some aspects, identifying one or more user group identifiers includes selecting, as the one or more user group identifiers, each user group identifier that has been received from client devices including the client device at least a threshold number of times during a specified time period. The request signals can include contextual signals. Some aspects can include identifying one or more contextual signals that satisfy a respective k-anonymity process and providing the one or more contextual signals with the selection parameter request.

In some aspects, transmitting, to each of one or more first content platforms, a selection parameter request including at least one or more of the user group identifiers includes transmitting, to each of the one or more first content platforms, a separate selection parameter request for each of the one or more user group identifiers.

In some aspects, transmitting at least a portion of the selection parameters to a second content platform includes identifying a set of the selection parameters that satisfy a second k-anonymity process and transmitting, as at least a portion of the selection parameters, the set of selection parameters that satisfy the second k-anonymity process.

In some aspects, the client device transmits a second content request to the second content platform. The second content request result can include the adjusted selection parameter for each selected digital component and contextual signals. The second platform can select a given digital component for presentation at the client device from among a set of digital components including each selected digital component and one or more additional digital components identified based on the contextual signals independent of any of the user group identifiers.

In some aspects, each selection parameter element includes a creative element that includes the data indicating the respective digital component of the selection parameter element. Each creative element can include one or more categories for content of the respective digital component, a unique identifier for a digital component provider that publishes the respective digital component, and a digital signature generated for the creative element by the second content platform. Transmitting at least a portion of the selection parameters to a second content platform can include selecting a set of digital components based on the one or more categories of each creative element and transmitting as at least a portion of the selection parameters, the selection parameters for the selected set of digital components. Selecting a set of digital components based on the one or more categories of each creative element can include comparing the one or more categories of each creative element to a set of excluded categories for an electronic resource of a publisher for which content is being requested and selecting, for inclusion in the set of digital components, each digital component for which the one or more categories does not match any excluded category in the set of excluded categories.

The subject matter described in this specification can be implemented in particular embodiments so as to realize one or more of the following advantages. The addition of a user group request computing system operated by a trusted party to a content distribution ecosystem enables user group membership data to be used in selecting content for users in ways that preserve user privacy while preventing access to techniques used by content platforms to select or provide content to the user, thereby protecting confidentiality of all entities without a negative impact on user experience. Rather than maintain user group membership of users at content platforms, such membership data can be maintained securely at the users' client devices to preserve user privacy with respect to the membership data. The client devices can provide the group membership data (e.g., user group identifiers that identify user groups that include the user as a member) to the user group request system with content requests rather than to the content platforms.

To protect user privacy with respect to the content platforms, the user group request system can enforce k-anonymity on each user group identifier prior to providing user group identifiers to the content platforms so that the content platforms cannot associate user group identifiers with individual users. As the user group request system is maintained by a trusted party, all of the user group identifiers for a user can be transmitted in a single request to the user group request system rather than sending them one at a time, which reduces the computational burden placed on the user group request system and reduces the consumed bandwidth of a network over which the requests are transmitted. The use of the user group request system also precludes user group-based requests from reaching the content platforms directly. This prevents the requests from conveying any unsanctioned targeting signals, such as the browser's first party cookie or the Internet Protocol (IP) address of the client device to the content platforms.

The user group request system can further protect this group membership data by sending batches of requests for multiple client devices to the content platforms such that individual requests cannot be correlated with individual users based on the timing of the requests. Buffering and time delays can also be employed by the user group request system to further prevent such correlations. The user group requests system can also enforce k-anonymity on selection parameters to prevent content platforms from tracking users based on uncommon selection parameters provided for content requests that include particular sets of request signals.

The inclusion of the user group request system also protects access to content selection logic used by content platforms, e.g., supply-side platforms (SSPs) when selecting content by enabling such selection to happen at the content platforms rather than on the client device. With the user group request system maintaining and preserving the privacy of the user group membership data, user privacy is preserved without moving the selection process to the client device which could expose the content platforms' selection logic. Selection parameters can be encrypted by content platforms, e.g., demand-side platforms (DSPs), to prevent other entities from accessing these parameters.

The user group request system can store creative elements for digital components locally, e.g., in a cache, to further protect user privacy, reduce latency in providing digital components, reduce the computational burden placed on content platforms, e.g., on DSPs, and reduce network bandwidth consumption. For example, if a DSP previously provided a creative element and corresponding selection parameter (e.g., bid) for a particular set of request signals, e.g., for a particular user group identifier, the user group request system can cache the creative element and selection parameter and use this cached data for subsequent content requests having the same request signals. This prevents the provision of the request signals (e.g., use group identifiers) to the DSPs, which preserves user privacy, while reducing the number of requests sent to the DSPs, which reduces the computational burden placed on the DSPs, reduces consumed network bandwidth, and reduces the latency in providing content in response to requests that would otherwise be caused by requesting selection parameters from the DSPs. In addition, by batching the requests sent to the content platforms, which preserves user privacy as described above, also reduces the computational burden placed on the DSPs by reducing the number of requests per time period handled by the DSPs and reduces consumed network bandwidth by reducing the number of requests transmitted over the network. Reducing the latency in content provision also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for preserving the privacy of users and preventing access to information of other entities, e.g., content platforms, resource publishers, and content providers, when analyzing user data. A user group request system can be used to preserve such privacy and information protection, while still enabling content platforms to select and provide content based on the user group membership of users such that the user experience is not negatively affected. The user group request system and content platforms can use a combination of k-anonymity, encryption, batching, and/or buffering techniques that, when used together as described below, provide a synergistic effect of preserving privacy and protecting access to information of each entity involved in the content selection and distribution process.

Figure 1:
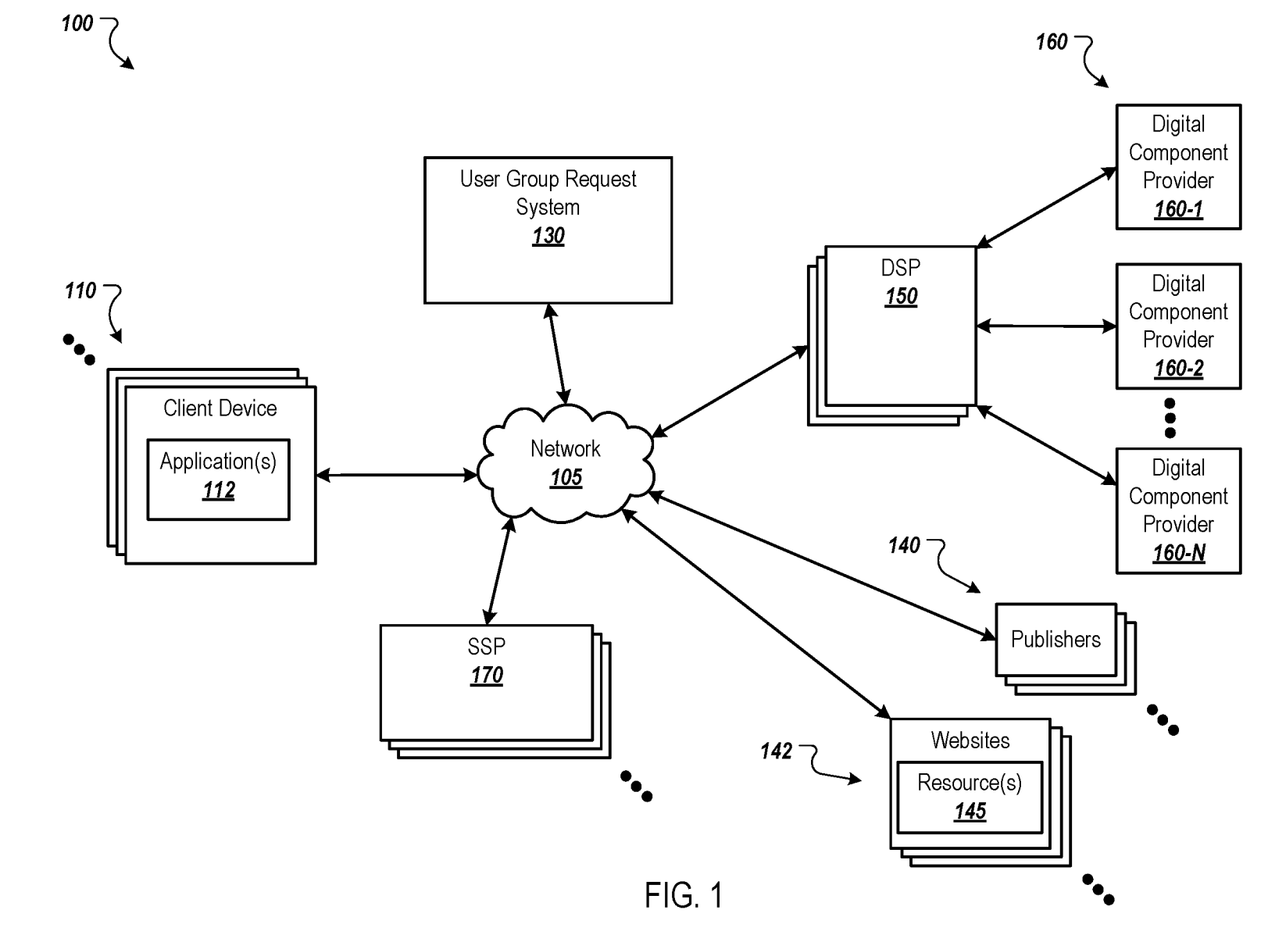
FIG. 1 is a block diagram of an environment in which content is distributed to client devices.

FIG. 1 is a block diagram of an environment 100 in which content is distributed to client devices 110. The example environment 100 includes a data communication network 105, such as a local area network (LAN), a wide area network (WAN), the Internet, a mobile network, or a combination thereof. The network 105 connects the client devices 110, a user group request system 130, demand-side platforms (DSPs) 150, supply-side platforms (SSPs) 170, publishers 140, and websites 142. The example environment 100 may include many different client devices 110, user request systems 130, DSPs 150, SSPs 170, publishers 140, and websites 142.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. An SSP 170 can interact with one or more DSPs 150 to obtain information that can be used to select a digital component for a digital component slot. As described in more detail below, this information can include a selection parameter that represents an amount that a digital component provider 160 is willing to provide to the publisher 140 for presentation of a digital component of the digital component provider 160. For example, a selection parameter may be a bid. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications.

The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple SSPs 170 on behalf of digital component providers 160 to provide digital components for presentation with the resources and/or applications of multiple different publishers 140. In general, a DSP 150 can receive requests for digital components (e.g., from an SSP 170 directly or by way of an exchange), generate (or select) a selection parameter for one or more digital components created by one or more digital component providers based on the request, and provide data related to the digital component (e.g., the digital component itself) and the selection parameter to an SSP 170.

The ways in which SSPs 170 select digital components and the ways in which DSPs 150 distribute digital components (e.g., generate selection parameters and/or the selection parameters themselves) generally include information that should not be shared with other parties. The techniques described in this document protect this information from being shared or leaked to other parties. The SSPs 170 and DSPs 150 can also be referred to as content platforms.

In some cases, it is beneficial to a user to receive digital components related to web pages, application pages, or other electronic resources previously visited and/or interacted with by the user. In order to distribute such digital components to users, the users can be assigned to user groups when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160.

To protect user privacy, a user's group membership can be maintained at the user's client device 110, e.g., by one of the applications 112 (or the device operating system or another trusted program), rather than by a digital component provider, content platform, or other party. In a particular example, a web browser or operating system can maintain a list of user group identifiers ("user group list") for a user using the web browser or another application. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add one or more user group identifiers to the user group list and store the user group list securely.

The user group request system 130 enables the use of user group membership in selecting content for providing to the client devices 110 while maintaining the privacy of this membership data and protecting access to the data of the DSPs 150 and SSPs 170. The user group request system 130 can be implemented using one or more computing systems maintained by a trusted party, e.g., a trusted third party different from the users, SSPs 170, DSPs 150, the publishers 140, and the digital component providers 160. For example, an industry group, governmental group, or browser developer may maintain and operate the user group request system 130.

The user group request system 130 can perform several functions to preserve privacy and protect access to information of the entities. For example, the user group request system 130 can interact with the DSPs 150 and the SSPs 170 to select digital components based on user group identifiers using techniques that prevent the DSPs 150 and SSPs 170 from being able to correlate users with their user group membership. To do so, the user group request system 130 can enforce k-anonymity on user group identifiers prior to providing the user group identifiers to DSPs 150 for use in selecting digital components and their selection parameters. In doing so, the SSPs 170 can perform their content selection processes rather than moving those processes to the client devices 110, which could potentially expose their confidential selection process logic. The user group request system 130 can also enforce k-anonymity on selection parameters provided by DSPs 150 to prevent the DSPs 150 from using uncommon selection parameters for particular sets of request signals to track the users for which the request signals were provided to the DSPs 150. These features are described in more detail below with reference to FIG. 2.

To obtain a digital component for a digital component slot, the application 112 can be configured to split a content request into two separate requests. The application 112 can send a first content request to the user group request system 130. This content request can be for a digital component selected based on the user group membership of the user. This content request can include the user group identifiers of the user groups that include the user as a member. As described in more detail below, the user group request system 130 can interact with the DSPs 150 and SSPs 170 to select one or more digital components to provide to the application 112 based on the user group identifiers. The user group request system 130 can provide a creative element for each selected digital component and an adjusted selection parameter to the application 112. The creative elements and adjusted selection parameters are described below.

The application 112 can then send a second content request to the SSP 170. The application 112 can send this content request to the SSP 170 for the publisher 140 of the electronic resource for which the content is being requested. This content request can be for the digital component that will ultimately be presented with the electronic resource. That is, the application 112 may not immediately present the digital components of the creative elements received from the user group request system 130. Instead, these digital components may be candidates that are provided to the SSP 170 for a final selection process.

This second content request can include the adjusted selection parameters for the one or more creative elements received from the user group request system 130 in response to the first content request and contextual signals that can be used by the DSPs 150 to select digital components. The SSP 170 can interact with the DSPs 150 to obtain selection parameters for digital components that are selected based on the contextual signals. In this selection, the DSPs 150 may not have access to the user group membership data. That is, the DSPs 150 may select the digital components and their corresponding selection parameters based on the contextual signals independent of user group membership.

The SSP 170 can use its content selection logic to select the digital component for the application 112 from a set of digital components that includes the one or more digital components selected based on the user group identifiers in response to the first content request and the digital components selected in response to the second content request based on the contextual signals. The SSP 170 can then provide the selected digital component (or data identifying the digital component or that can be used to obtain and present the digital component) to the application 112 for presentation to the user.

In some implementations, an application 112 can provide a user interface that enables a user to manage the user groups to which the user is assigned. For example, the user interface can enable the user to remove user group identifiers, prevent all or particular resources, publishers, digital component providers, digital component exchanges, and/or DSPs 150 from adding the user to a user group (e.g., prevent the entity from adding user group identifiers to the list of user group identifiers maintained by the application 112). This provides better transparency and control for the user.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
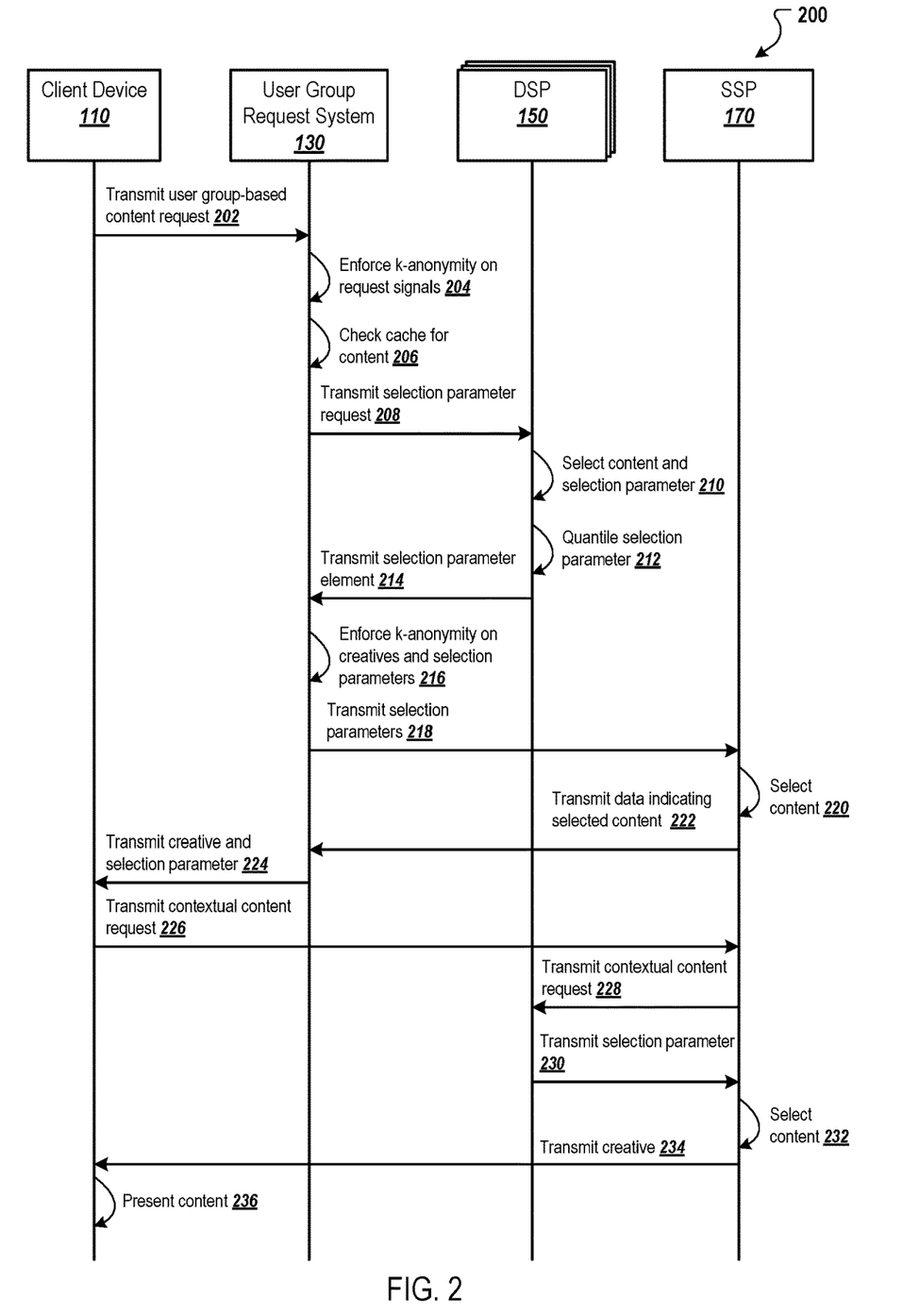
FIG. 2 is a swim lane diagram that illustrates an example process for selecting and providing content to a client device.

FIG. 2 is a swim lane diagram that illustrates an example process 200 for selecting and providing content to a client device 110. Operations of the process 200 can be implemented, for example, by the client device 110, the user group request system 130, one or more DSPs 150, and an SSP 170. Operations of the process 200 can also be implemented as instructions stored on one or more computer readable media which may be non-transitory, and execution of the instructions by one or more data processing apparatus can cause the one or more data processing apparatus to perform the operations of the process 200.

In this example, the SSP 170 is the SSP used by a particular publisher corresponding to the electronic resource with which the content will be presented. That is, the SSP 170 is the one that manages the process of obtaining digital components for digital component slots of the publisher's resources and/or applications and the client device 110 requests content in response to an application of the client device 110 loading an electronic resource (e.g., web page or native application) of the publisher.

The SSP 170 can review digital components prior to enabling the digital components to be provided for presentation with electronic resources of the publishers for which the SSP 170 obtains digital components. For example, the SSP 170 can review the content and format of a digital component to ensure that it meets various criteria, e.g., does not include particular types of content, meets data and/or display size requirements, etc. Each SSP 170 can review and approve/deny digital components for its respective publishers.

If the SSP 170 approves a digital component, the SSP 170 can generate a signed creative element for the digital component. The signed creative element can include a set of content and a digital signature generated based on the set of content. For example, the set of content can include a creative snippet, a digital component provider identifier (or provider account identifier) that uniquely identifies the digital component provider that created and/or publishes the digital component (which allows the SSP 170 to determine the corresponding DSP 150 for the digital component), creative metadata, a resource locator for the SSP 170, and/or an expiration date for the digital signature (e.g., to require DSPs to resubmit digital components periodically for reverification).

The creative snippet can include the digital component itself (or a resource locator or link to a server from which the digital component can be downloaded). The creative snippet can also include computer-executable code for rendering the digital component, e.g., a Hypertext Markup Language (HTML) snippet and/or a script to download the digital component from a server and render the digital component in a digital component slot. The creative snippet can also include computer-executable code for transmitting information about a presentation of the digital component to a report server, e.g., a script that causes a client device to transmit the information to a report server.

The resource locator for the SSP 170 can be the eTLD+1 for a domain of the SSP 170. The eTLD+1 is the effective top-level domain (eTLD) plus one level more than the public suffix. An example eTLD+1 is "example.com" where ".com" is the top-level domain.

The metadata can include a set of properties that enable the user group request system 130 to enforce publisher-defined exclusions on digital components or DSPs. For example, a publisher may not allow digital components having particular properties (e.g., having content related to particular categories) to be presented with its resources. The metadata can include a list of prohibited categories, topics, or other properties of digital components that are prohibited by the publisher.

In some implementations, the SSP 170 can encrypt each property and include each encrypted property in the signed creative element. For example, the SSP 170 can encrypt each property using a symmetric deterministic encryption algorithm with a secret key of the SSP 170. In this way, only the SSP 170 can access the plaintext value of each property using the same symmetric encryption algorithm with the same secret key. Although assymmetric public/private key encryption/decryption could be used instead of symmetric encryption, it likely would not be required.

As described below, the user group request system 130 can use the properties (e.g., in encrypted form) to exclude digital components for the publisher. If the properties are encrypted, the user group request system 130 can still perform the exclusions while being unable to determine which properties the publisher excludes, thereby protecting confidential information of the publisher.

The SSP 170 can create the digital signature by signing over the set of content using an asymmetric private key of the SSP 170. Recipients of the signed creative element can verify the digital signature using an asymmetric public key corresponding to the private key used to generate the signature. If any piece of data changes in the set of content after the digital signature is generated, the verification of the digital signature will fail. The SSP 170 can send the signed creative element for each digital component to the DSP 150 for the digital component provider 160 that created/published the digital component.

The client device 110 transmits a user group-based content request to the user group request system 130 (202). For example, a web browser running on the client device 110 can load a resource of a publisher having one or more digital component slots. In another example, a user may launch a native application of a publisher and the content of the application may include one or more digital component slots. The application 112 that includes the digital component slots can transmit the user group-based content request.

In this example process 200, the application 112 can transmit two separate content requests. The application 112 can first transmit a user group-based content request to request one or more digital components based on one or more user groups to which the user of the client device 110 is assigned, e.g., the groups that include the user as a member. The application 112 can then send a contextual content request that requests a digital component based on additional contextual information and, if one is obtained using the user-group based content request, the selection parameter of the digital component selected based on the one or more user groups, and optionally data identifying the DSP that submitted the selection parameter for the digital component (e.g., without information identifying the digital component or the digital component itself). This enables the contextual content selection process to include digital components selected based on the one or more user groups while preserving user privacy with respect to the user groups to which the user is assigned and protecting access to the information of the DSPs/SSPs used to select the digital components.

The user group-based content request can include a set of request signals. The set of request signals can include some contextual signals, but fewer than what is included in the contextual content request described below. For example, the user-group content request can include a resource locator for the resource, e.g., a Universal Resource Locator (URL) for a web page or Universal Resource Identifier (URI) for application content. The user-group content request can also include a language (e.g., the language in which content is presented by the application rendering the content) and/or coarse geographic location information indicating a coarse location of the client device 110.

The set of request signals can also include the user group identifiers for the user groups to which the user of the client device 110 is assigned. In some implementations, the application 112 sends a respective user group-based content request for each user group identifier for the user. As the user group request system 130 is operated by a trusted party, the application 112 can send a single user-group based content request that includes all (or at least multiple) user group identifiers for the user. This reduces the battery consumption and computational burden that would be placed on the client device 110 if a separate request is sent for each user group identifier.

The user group-based content request can include encrypted user group identifiers to protect user privacy. The application 112 can encrypt each user group identifier in such a way that only the intended DSP 150 can decrypt the user group identifier. That is, only the DSP 150 for the digital component provider 160 that generated the user group and that assigns users to the user group can decrypt the user group identifier. For example, the application can encrypt each user group identifier using a public key of the intended DSP 150.

To enable the user group request system 130 to enforce k-anonymity on the user group identifiers, i.e., at least k users or their applications have to belong to a given user group during a given period of time for the user group identifier to be used for content selection, the encryption can be deterministic for the duration of the given period of time but probabilistic over a larger period of time. One way to achieve this is to rely on a deterministic public key encryption algorithm with a pseudo-nonce calculated based on quantiled timestamp. For example, if the duration to enforce k-anonymity is one week, the application 112 can encrypt each user group identifier using the following formula: $Encrypt_{deterministic}(User\_Group\_Identifier \| number\_of\_weeks\_since\_epoch, DSP\_key)$. In this example, "$Encrypt_{deterministic}$" is a deterministic public key based encryption algorithm, "User_Group_Identifier‖number_of_weeks_since_epoch" is a complex message based on the user group identifier and the number of weeks since a fixed and well known time in history, e.g., Unix time, and "DSP_key" is the public key of the intended DSP 150. Thus, in this formula, the complex message is encrypted using the deterministic public key based encryption algorithm and the public key of the intended DSP 150.

The user group request system 130 receives the user group-based content request and enforces k-anonymity on the request signals (204). K-anonymity techniques can be used to ensure that the request signals for each user for which an application sends user group-based content requests are shared among at least K users and therefore cannot uniquely identify a single user or a small group of users. When applying k-anonymity on the request signals, the user group content request can use the request signals received from multiple client devices, e.g., of many different users from which user group content requests have been received, over a period of time, e.g., that day, week, month, etc.

In some implementations, the user group request system 130 enforces k-anonymity on each user group identifier in combination with the other request signals, e.g., the contextual signals. For example, if the user group content request includes user group identifiers A and B, the user group request system 130 can compare a combination of identifier A and the contextual signals to other combinations that include an identifier and contextual signals. If at least K unique applications 112 (or unique client devices) have sent a request that includes the same combination of identifier A and the contextual signals, then the combination of identifier A and the contextual signals satisfy k-anonymity. In this example, the user group request system 130 can send the user group identifier A and the request signals to the DSP 150 for user group identifier A, as described below.

In some implementations, the user group request system 130 enforces k-anonymity on each user group identifier and each request signal separately. In this example, the user group request system 130 can determine the number of applications 112 (or client devices) that sent a content request with user group identifier A over the period of time. If at least k unique applications or client devices sent a request that included identifier A during the period of time, user group identifier A satisfies k-anonymity and can be provided to the DSP 150 for user group identifier A. If the geographic location of the client device also satisfies k-anonymity, the user group request system 130 can also send the geographic location with each user group identifier that satisfies k-anonymity. If another contextual signal does not satisfy k-anonymity, that request signal may not be provided to the DSPs 150.

As described above, the user group identifiers may be encrypted. In this example, the user group request system can compare the encryption result for each user group identifier to the other encrypted results received from other client devices to determine the number of unique applications or client devices that send the user group identifier.

The user group request system 130 can also ignore user group-based content requests for particular resource locators. For example, the user group request system 130 can maintain a list of resource locators (e.g., a list of web pages, websites or apps that could be presented to the user of the client device 110) for which content is not selected based on user group identifiers. These resource locators can be for rare resources, e.g., ones that may be new and created for fraudulent purposes and/or sensitive resources, e.g., ones for particular medical conditions.

The user group request system 130 checks a cache (or other local storage) for content (206). The cache can include previous creative elements and corresponding selection parameters provided by DSPs 150 for previous content requests. For example, if a DSP provided creative element C with selection parameter P for a request that includes user group identifier A, the user group request system 130 can cache a mapping (or other link or association) between creative element C and its selection parameter P, and the user group identifier A.

The user group request system 130 can check the cache for each signal or group of signals that satisfy k-anonymity. If there is a match, the user group system 130 can use the previous creative element and selection parameter from the cache without sending a selection parameter request to the DSP 150 that provided the creative element and selection parameter previously. Continuing the previous example, if the user group-based content request includes user group identifier A and user group identifier A satisfies k-anonymity, then the user group request system 130 can use creative element C and its selection parameter P for the following steps of the process 200 without requesting a selection parameter from the DSP 150 that previously provided creative element C.

The user group request system 130 transmits a selection parameter request to one or more DSPs 150 (208). For each user group identifier that satisfies k-anonymity, the user group request system 130 can send a selection parameter request to the DSP 150 for the user group identifier. However, if there is already a creative element and selection parameter in the cache for a given user group identifier and applicable request signals, a selection parameter request may not be sent for that user group identifier. The selection parameter request sent to a given DSP 150 can include the user group identifier for that DSP 150 and the request signals that satisfy k-anonymity.

During a small window of time, e.g., 100 milliseconds (ms) or some other appropriate window of time, many applications running on many client devices may send multiple user group content requests to the user group request system 130, all of which are intended for the same DSP 150. In some implementations, the user group request system 130 can generate a batch request for each DSP 150 that includes multiple selection parameter requests (or the data for the multiple selection parameter requests) intended for the DSP 150. By sending a batch of requests, the amount of consumed bandwidth and the computational burden placed on the DSPs 150 can be reduced. This also prevents timing based attacks by making it difficult for a DSP 150 to correlate multiple requests with a given client device or its user.

In some implementations, the user group request system 130 can delay sending a selection parameter request for a received user group-based content request for a delay time period, which can vary from request to request. This can further reduce the likelihood of a successful timing based attack.

Each DSP 150 that receives a selection parameter request selects content and determines a selection parameter for the content (210). For example, a DSP 150 can receive the selection parameter request for the user-based content request and identify the user group identifier and any contextual signals included in the selection parameter request. The DSP 150 can select one or more digital components based on the user group identifier and the contextual signals. The DSP 150 can also generate or select a selection parameter for the digital component based on the user group identifier and/or the contextual data.

Each DSP 150 can quantile its determined selection parameter (212). For example, each DSP 150 can maintain a set of quantiles and compare the determined selection parameter to the range of values of each quantile. The DSP 150 can then determine a quantiled selection parameter. That is, the DSP 150 can substitute, for the determined selection parameter, a value that represents the matching quantile for the determined selection parameter. For example, if the selection parameter has a value of 9 and there is a quantile with a range of 7-10 with a quantiled value of 8.5, the DSP can substitute the quantiled value of 8.5 for the selection parameter.

Using this quantile technique reduces the quantity of different selection parameters submitted by the DSP 150 to the user group request system 130. This makes it more likely that a DSP 150 will submit at least a threshold number, e.g., k in a k-anonymity process, of the same selection parameter which enables the selection parameter to satisfy k-anonymity, as described below. The size of each quantile for a DSP 150 can be selected based on the number of times the DSP 150 submits selection parameters to the user group request system 130. For example, if the DSP 150 sends a large number of selection parameters, the range of values of each quantile can be small as the large number of requests makes it more likely that various quantiles will have a sufficient number of selection parameters.

The DSPs 150 transmit a selection parameter element to the user group request system 130 (214). The selection parameter request sent by a DSP 150 can include a creative element that identifies the selected digital component and the selection parameter, which can be quantiled and/or encrypted.

The techniques for protecting the selection parameter can include multiple layers of protection to protect the DSP 150 and preserve user privacy. For example, only the SSP 170 should know the identity of the DSP 150 that submitted the highest selection parameter and the corresponding highest selection parameter in plaintext. Otherwise, the plaintext selection parameter from a DSP 150 should, in general, be confidential from any parties in any circumstances. In addition, the user group request system 130 performs k-anonymity on the selection parameters from a DSP 150 to prevent micro-targeting users.

To protect the identity of the DSP 150 that submitted the highest selection parameter and each selection parameter, each DSP 150 can encrypt its selection parameter using an encryption key shared by the DSP 150 and the SSP 170.

Each DSP 150 can use and confidentially maintain a different encryption key than each other DSP 150. This encryption algorithm can be a symmetric encryption algorithm. To enable a k-anonymity process to be performed on the encrypted selection parameters, the encryption algorithm can also be deterministic. A DSP 150 and the SSP 170 can establish the shared encryption key via Diffie Hellman key exchange algorithm. One example encryption algorithm that can be used to encrypt the selection parameters is the Advanced Encryption Standard (AES). In some implementations, each DSP 150 can encrypt its selection parameter using an asymmetric encryption algorithm with the SSP's 170 public key.

In some implementations, the selection parameter element sent by each DSP 150 can include additional information to verify the authenticity of the selection parameter and provide better security and privacy protection. For example, the selection parameter request sent by a DSP 150 can include the creative element for the digital component, the encrypted quantiled selection parameter, the user group identifier used to select the digital component and any contextual signals received with the user group identifier, a timestamp, and a nonce.

The user group identifier and the contextual signals enable the user group request system 130 to correlate the selection parameters with the appropriate user group-based content request. The timestamp and nonce can be sent from the user group request system 130 to the DSPs 150 with the selection parameter request. The timestamp can indicate a time at which the selection parameter request is sent to the DSP 150. The timestamps and nonce can be used to identify individual requests and prevent replay attacks. For example, if multiple selection parameter requests are received with the same timestamp and nonce, the DSP 150 can determine that it's a copy of a previous request. The user group request system 130 can make the same determination if multiple selection parameter elements are received from the same DSP 150 with the same timestamp and nonce. If the DSP 150 generates the timestamp and nonce, the DSP 150 may encode additional information that may weaken the security and privacy protection.

The DSP 150 can also digitally sign the selection parameter element to protect the selection parameter from tampering or falsification. For example, the DSP 150 can generate a digital signature by signing over the content of the selection parameter element using a private key of the DSP 150.

The DSP 150 transmits the selection parameter element to the user group request system 130 (214). If the selection parameter element is digitally signed, the user group request system 130 can verify the digital signature using a public key that corresponds to the DSP's private key used to sign the selection parameter element. If this verification fails, the user group request system 130 can ignore the selection parameter element.

The user group request system 130 enforces k-anonymity on the creative elements and the selection parameters (216). The user group request system 130 can enforce k-anonymity on the selection parameters for each DSP 150. That is, before a selection parameter submitted by a DSP 150 can be used to select content for a client device, the selection parameter has to have been received at least a threshold, e.g., k, unique times from the DSP 150. This prevents the DSP 150 from micro-targeting users with uncommon selection parameter values and colluding with the SSP 170 to correlate additional contextual signals with the user if the selection parameter is returned to the SSP with the contextual content request described below. The user group request system 130 can compare the number of times the selection parameter has been received from the DSP 150 over a specified time period. If the number satisfies the threshold, e.g., by meeting or exceeding the threshold, the user group request system 130 can determine that the selection parameter satisfies k-anonymity.

The user group content request 130 can similarly compare the number of times the DSP 150 has provided the creative element to a threshold, e.g., k. If the number satisfies the threshold, e.g., by meeting or exceeding the threshold, the user group request system 130 can determine that the creative element satisfies k-anonymity. Enforcing k-anonymity on the creative elements also prevents micro-targeting of particular users using particular digital components. The thresholds for the selection parameters and the creative elements can be the same or different.

The user group request system 130 transmits at least a portion of the selection parameters received for the user group-based content request to the SSP 170 (218). The user group request system 130 may only transmit the selection parameters that satisfy k-anonymity and correspond to a creative element that also satisfies k-anonymity. For each selection parameter, the user group request system 130 can also transmit data identifying the DSP 150 that submitted the selection parameter. In some implementations, the user group request system 130 also sends, with the selection parameter, the creative element corresponding to the selection parameter.

The SSP 170 can select content based on the received selection parameters (220). As described above, the selection parameters can be encrypted by the DSPs 150 using encryption keys shared with the SSP 170. The SSP 170 can use the corresponding encryption keys to decrypt the selection parameters. The SSP 170 can identify the highest selection parameter and select the digital component corresponding to the highest selection parameter.

The selection parameters provided by the DSPs 150 can be in the form of a total amount that the digital component provider is willing to provide for presentation of the digital component or a publisher amount that the publisher will receive for presentation of the digital component. For example, the total amount may be divided between the publisher, the DSP 150, and/or the SSP 170.

If the DSPs 150 are to provide publisher amounts, the SSP 170 can select the highest publisher amount, i.e., the highest selection parameter. However, if the DSPs 150 are to provide total amounts, the SSP 170 can determine the publisher amount based on various rules and/or selection logic. For example, the SSP 170 can look up a rule that defines, for a particular publisher and DSP 150 combination, how much of the total amount is allocated to the publisher. In other words, the SSP 170 can use selection parameter sharing agreements between DSPs 150 and publishers to determine the publisher amount for each total amount received from the DSPs 150. The SSP 170 can then select the highest publisher amount. The SSP 170 can determine the publisher based on a resource location (e.g., the domain or URL) of the resource for which content is being selected. The information used to determine the publisher amounts is typically confidential. Using the user group requests system 130 in this environment 100 enables this information to be used at the SSP 170 rather than the client device 110, which prevents leaking of the information.

In some implementations, the SSP 170 can apply exclusions to exclude the selection parameters for some DSPs 150 from this content selection process. For example, a publisher may not want content of a particular DSP 150 or digital component provider 160 presented with its electronic resources. Each publisher 140 can provide, to the SSP 170, data identifying excluded (or included) DSPs 150 and/or digital component providers. The SSP 170 can apply the exclusions based on the resource locator of the resource for which content is being selected.

A publisher may not allow digital components having particular properties (e.g., having content related to particular categories) to be presented with its resources. The SSP 170 for the publisher can define a set of digital component properties to support creative exclusion. Such properties can be represented as a finite discrete set: $P=\{P_1, P_2, \ldots, P_n\}$. The SSP 170 can optionally encrypt these properties using a deterministic symmetric encryption algorithm using the SSP's secret encryption key, similar to how the properties can be encrypted for inclusion in the signed creative elements.

The SSP 170 can store the set of properties for each publisher locally, e.g., in a cache. For example, the SSP 170 can maintain a data structure similar to Table 1 below.

TABLE 1

| Resource Locator | Creative Exclusion |
| --- | --- |
| example.com/mainpage | $P_1, P_{41}, P_{90}$ |
| example.com/secondpage | $P_7$ |

In this table, each property (e.g., $P_1$, $P_{41}$, etc.) can be a category of content of digital components, an object depicted by a digital component, or other property of digital components. For each resource locator, the set of properties in the creative exclusion column indicates the properties that, if assigned to a digital component, indicates that the digital component should not be provided for presentation with the resource corresponding to the resource locator.

To apply the creative exclusion for a selection parameter element, the SSP 170 can obtain, from the signed creative element, the set of properties included in the metadata of the signed creative element. The SSP 170 can then compute the intersection of the set of properties of the signed creative element with the set of properties defined as creative exclusions for the resource locator of the request identifier included in the selection parameter element. If the intersection is empty, the digital component of the signed creative element is eligible for presentation with the resource corresponding to the resource locator. Otherwise, the SSP 170 can ignore the creative element and its selection parameter.

The SSP 170 transmits data indicating the selected content to the user group request system 130 (222). For example, the SSP 170 can transmit data identifying the DSP 150 that submitted the highest selection parameter, e.g., the DSP 150 corresponding to the highest publisher amount. The SSP 170 may not transmit the selection parameter in plaintext to maintain the confidentiality of the selection parameters. Instead, only the SSP 170 and DSP 150 can have access to selection parameters in plaintext.

The user group request system 130 identifies the creative element corresponding to the selected content and provides the creative element to the application 112 that submitted the user group-based content request (224). The user group request system 130 can also send the encrypted selection parameter to the application 112. For example, the user group request system 130 can send a user group content response to the user group-based content request. The user group content response can include the creative element and the encrypted selection parameter for the creative element. The user group content response can also include data identifying the DSP that submitted the selection parameter for the creative element.

The user group content response can also include the digital signature of the selection parameter element that the DSP 150 submitted in response to the selection parameter request. By including this signature, if the digital component of the DSP 150 is ultimately selected for presentation by the application 112, the application 112 can include the digital signature in one or more reports sent by the application 112 to report the presentation of the digital component or a user interaction with the digital component. In this way, the DSP 150 or a reporting system for the DSP 150 can verify the signature to ensure that the presentation or user interaction was valid.

In some implementations, the SSP 170 can select multiple digital components in response to a user group-based content request based on the selection parameters. In this example, the user group request system 130 can transmit, to the application, a user group content response that includes the creative element for each selected digital component and the encrypted selection parameter for each selected digital component.

The application 112 transmits a contextual content request to the SSP 170 (226). The contextual content request can include at least a portion of the information in the user group content response and contextual data. For example, the contextual content request can include, from the user group content response, the encrypted selection parameter and the identifier of the DSP 150 that submitted the highest selection parameter, i.e., the DSP 150 for which the creative element was provided to the application 112. In some implementations, the contextual content request does not include data identifying the selected content or any of the user group identifiers of the user. Instead, the SSP 170 would only have access to the highest selection parameter and optionally the DSP 150 that submitted the highest selected parameter in this example.

The contextual data of the contextual content request can include the same contextual data as the user group-based content request plus additional contextual data, such as the number of digital component slots included in the resource, the location of the digital component slots within the resource (e.g., above the fold, below the fold, side of page, etc.), the size of the digital component slots, the type of digital component slots, etc.

The SSP 170 sends contextual content requests to one or more DSPs 150 (228). These contextual content requests can include the contextual data of the contextual content request received from the application 112, but not the information from the user group content response that was included in the contextual content request.

For at least some of the DSPs 150, this would be the second request received by the DSP 150 for the same potential presentation of content at the application 112. By batching requests to the DSPs 150 with the user group identifiers for multiple client devices and/or buffering or delaying those requests makes it difficult for the DSPs 150 to correlate this additional contextual data being provided for the same user with the user group identifiers of the user provided before. In addition, enforcing k-anonymity on the user group identifiers, the request signals, and selection parameters prevents the DSPs 150 from micro-targeting particular users based on uncommon user group identifiers, request signals, and/or selection parameters. For example, absent these techniques, the DSP 150 could provide a very rare selection parameter for a user group-based content request that includes a user group identifier that is specific to a particular user. If the SSP 170 colludes with the DSP 150, the SSP 170 could inform the DSP 150 that the highest selection parameter is the very rare one and provide the additional contextual signals of the contextual content request to the DSP 150. At this point, the DSP 150 can correlate all of the additional contextual data and the user group identifier with the user. Thus, the combination of batching, random delay and k-anonymity techniques described in this document preserves the user's privacy with respect to the SSPs 170 and DSPs 150 even in situations where they collude.

Each DSP 150 can transmit a selection parameter to the SSP 170 (230). For example, each DSP 150 can select one or more digital components based on the contextual data on behalf of the digital component provider(s) represented by the DSP 150. For each digital component, the DSP 150 can also generate or select a selection parameter for the digital component. The DSP 150 can then transmit, to the SSP 170, the selection parameter and data for the digital component (e.g., the signed creative element, the digital component itself, or a resource locator for the digital component).

The SSP 170 selects content (232). The SSP 170 can select content based at least in part on the selection parameters received from the DSPs 150 and the selection parameter for the digital component selected by the user group request system 130, i.e., the selection parameter of the contextual content request. As the selection parameters may be encrypted, the SSP 170 can decrypt the selection parameters using the encryption keys shared with the DSPs 150.

In this selection process, the set of digital components from which the SSP 170 is selecting can include at least one digital component selected based on the user group membership of the user, e.g., the digital component(s) selected in step 220. However, the SSP 170 would not know the identity of the digital component(s) selected based on the user group membership of the user, just the selection parameter and optionally the DSP that submitted the selection parameter. The set of digital components can also include one or more digital components selected based on the contextual signals, e.g., the digital component(s) for which the DSPs 150 provided selection parameters in step 230. The SSP 170 can select the digital component with the highest selection parameter among these digital components, e.g., the digital component for which the publisher amount is the highest.

The SSP 170 can then transmit the selected digital component and/or the creative element for the selected digital component to the client device 110 (234). If the selected digital component is a digital component selected based on the user group membership of the user, the SSP 170 can send data indicating that the digital component that was selected based on the user group membership is the one that was selected by the SSP 170, e.g., if the SSP 170 does not have data identifying the digital component that was selected based on the user group membership of the user. In turn, the application 112 can present the selected digital component with the publisher's resource (236).

Figure 3:
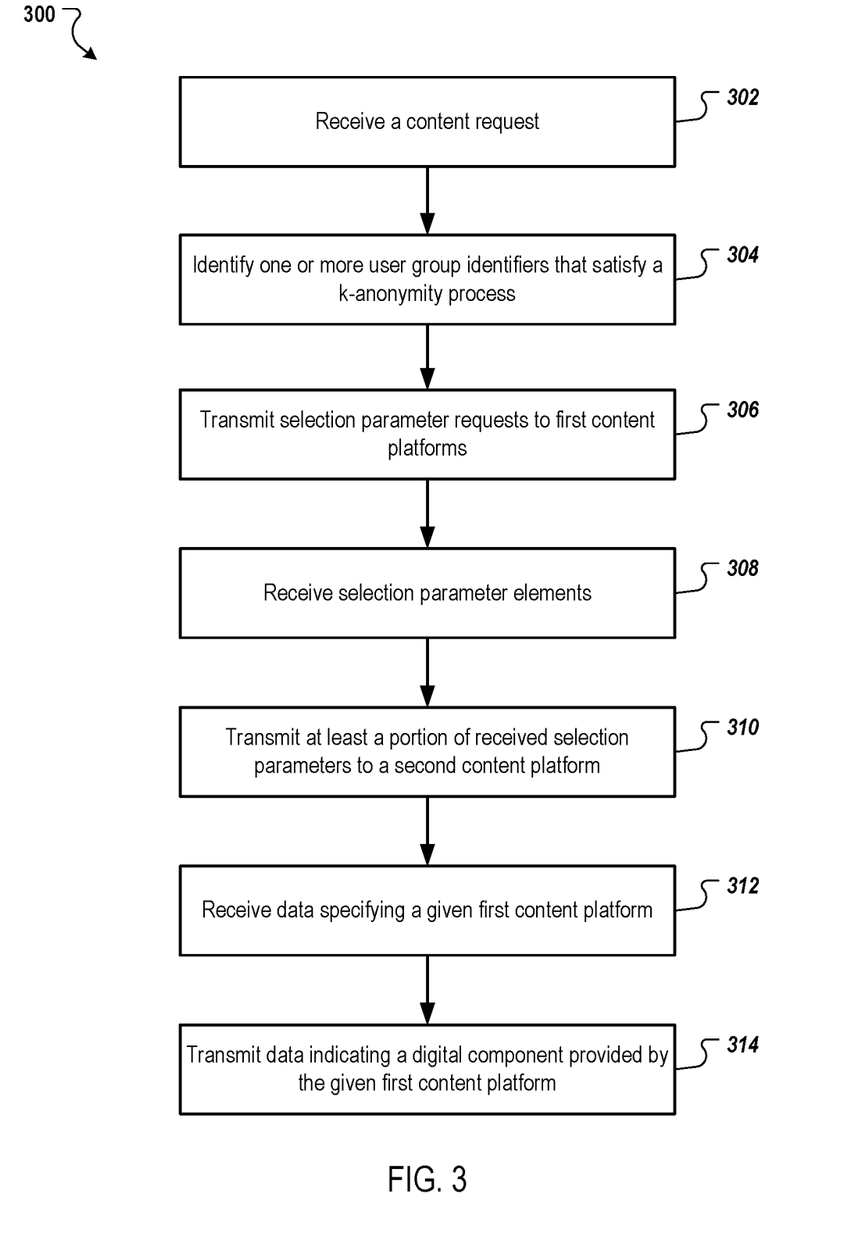
FIG. 3 is a flow diagram that illustrates an example process for selecting and providing content to a client device.

FIG. 3 is a flow diagram that illustrates an example process 300 for selecting and providing content to a client device. Operations of the process 300 can be implemented, for example, by the user group request system 130. Operations of the process 300 can also be implemented as instructions stored on one or more computer readable media which may be non-transitory, and execution of the instructions by one or more data processing apparatus can cause the one or more data processing apparatus to perform the operations of the process 300.

A content request is received from a client device (302). The content request can include a set of request signals, similar to the user group-based content request described above. The request signals can include user group identifiers that each identify a user group that includes the user of the client device as a member. The request signals can also include some contextual signals, e.g., a resource locator for an electronic resource with which selected content will be presented, a human (e.g., spoken) language of an application that submitted the content request, and/or a geographic location of the client device that transmitted the content request.

One or more user group identifiers that satisfy a first k-anonymity process for user groups are identified (304). This first k-anonymity process can include comparing a number of times each user group identifier has been received from a unique client device including the client device that transmitted the content request over a specified time period. This can include selecting, as the one or more user group identifiers, each user group identifier of the content request that has been received from client devices at least a threshold number of times during the specified time period. As described above, k-anonymity can also be enforced on each request signal.

A selection parameter request including at least one or more of the user group identifiers is transmitted to each of one or more first content platforms (306). Each first content platform can be a DSP. For each user group identifier that satisfies k-anonymity, a selection parameter request is sent to the first content platform for the user group identifier. The selection parameter request sent to a given first content platform can include the user group identifier for that DSP 150 and the request signals that satisfy k-anonymity.

Selection parameter elements are received from the one or more first content platforms (308). Each selection parameter element can include data indicating a respective digital component and a selection parameter for the respective digital component. For example, the selection parameter element can include a creative element selected by the first content platform and an encrypted selection parameter, as described above.

At least a portion of the selection parameters are transmitted to a second content platform (310). The second content platform can be an SSP. In addition to the selection parameters, data identifying the first content platform from which the selection parameter was received can be provided to the SSP.

The portion of selection parameters sent to the second content platform can include only the selection parameters that satisfy a second k-anonymity process. In some implementations, for a second parameter to be sent to the second content platform, the creative element corresponding to the selection parameter must also satisfy a third k-anonymity process.

Data specifying a given first content platform selected based on the selection parameters is received from the second content platform (312). For example, the second content platform can select one or more digital components based on the received selection parameters. The selected digital components can be the one or more digital components having the highest selection parameter(s). The second content platform can provide data specifying the first content platform that provided the selected digital component and/or data specifying the digital component itself.

Data indicating the digital component provided by the given first content platform is provided to the client device (314). In addition, the selection parameter for the digital component provided by the given first content platform can also be provided to the client device, e.g., in encrypted form. The client device can either present the content or send a second content request, e.g., a contextual content request to the second content platform, as described above FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

Figure 4:
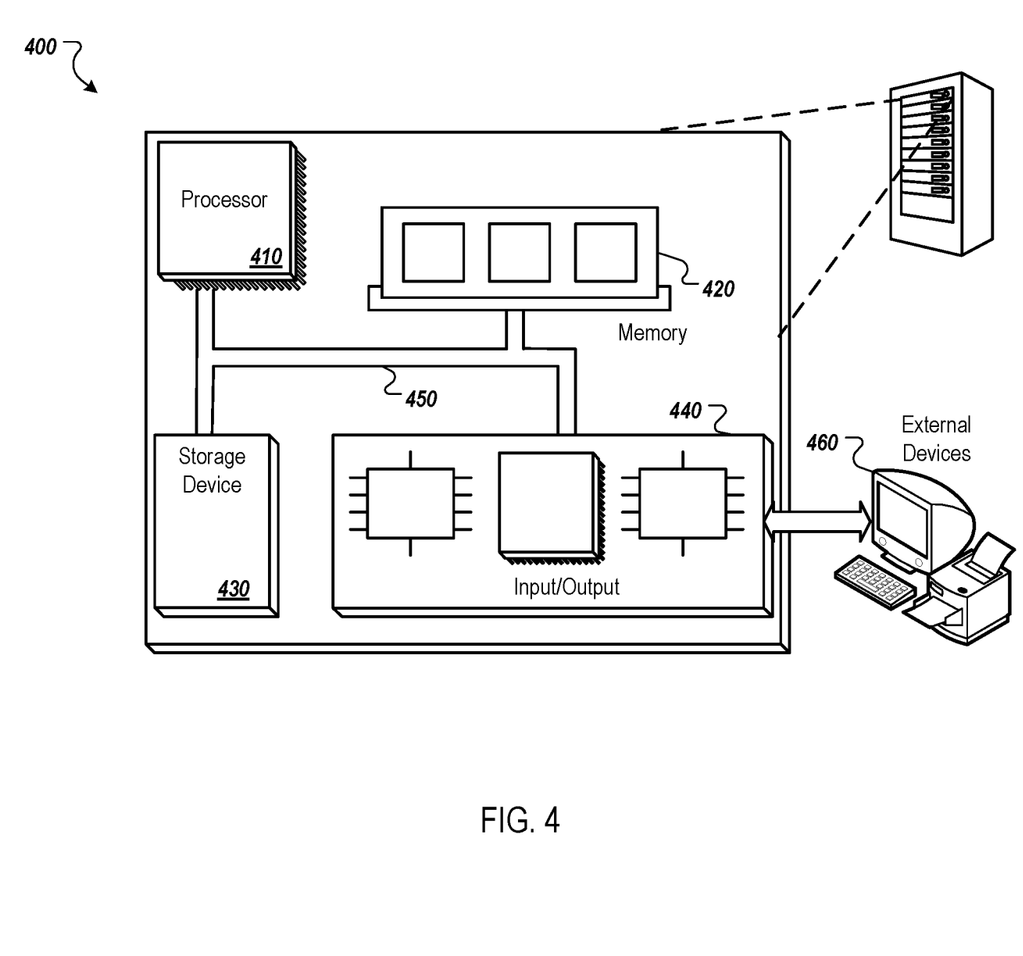
FIG. 4 is a block diagram of an example computer system.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 360, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, from a client device, a content request comprising a set of request signals specifying user group identifiers that each identify a user group that includes a user of the client device as a member;
identifying one or more user group identifiers that satisfy a first k-anonymity process;
transmitting, to each of one or more first content platforms, a selection parameter request comprising at least one of the one or more user group identifiers that satisfy the first k-anonymity process;
receiving, from the one or more first content platforms, selection parameter elements that each comprise data indicating a respective digital component and a selection parameter for the respective digital component;
transmitting, to a second content platform, one or more of the selection parameters and, for each selection parameter, data identifying the first content platform from which the selection parameter was received;
receiving, from the second content platform, data specifying a given first content platform selected based on the one or more selection parameters; and
transmitting, to the client device, data indicating the digital component provided by the given first content platform and the selection parameter for the digital component provided by the given first content platform.

2. The computer-implemented method of claim 1, wherein identifying one or more user group identifiers comprises selecting, as the one or more user group identifiers, each user group identifier that has been received from client devices including the client device at least a threshold number of times during a specified time period.

3. The computer-implemented method of claim 1, wherein the request signals further comprise contextual signals, the method further comprising:
identifying one or more contextual signals that satisfy a respective k-anonymity process; and
providing the one or more contextual signals with the selection parameter request.

4. The computer-implemented method of claim 1, wherein transmitting, to each of one or more first content platforms, a selection parameter request comprising at least one of the one or more user group identifiers that satisfy the first k-anonymity process comprises transmitting, to each of the one or more first content platforms, a separate selection parameter request for each of the one or more user group identifiers.

5. The computer-implemented method of claim 1, wherein transmitting one or more of the selection parameters to a second content platform comprises:
identifying a set of the selection parameters that satisfy a second k-anonymity process; and
transmitting, as the one or more selection parameters, the set of selection parameters that satisfy the second k-anonymity process.

6. The computer-implemented method of claim 1, wherein:
the client device transmits a second content request to the second content platform;
the second content request comprises the selection parameter for each selected digital component and contextual signals; and
the second content platform selects a given digital component for presentation at the client device from among a set of digital components comprising each selected digital component and one or more additional digital components identified based on the contextual signals independent of any of the user group identifiers.

7. The computer-implemented method of claim 1, wherein each selection parameter element comprises a creative element comprising the data indicating the respective digital component of the selection parameter element, wherein each creative element further comprises:
one or more categories for content of the respective digital component;
a unique identifier for a digital component provider that publishes the respective digital component; and
a digital signature generated for the creative element by the second content platform.

8. The computer-implemented method of claim 7, wherein transmitting one or more of the selection parameters to a second content platform comprises:
selecting a set of digital components based on the one or more categories of each creative element; and
transmitting, as the one or more selection parameters, the selection parameters for the selected set of digital components.

9. The computer-implemented method of claim 8, wherein selecting a set of digital components based on the one or more categories of each creative element comprises:
comparing the one or more categories of each creative element to a set of excluded categories for an electronic resource of a publisher for which content is being requested; and selecting, for inclusion in the set of digital components, each digital component for which the one or more categories does not match any excluded category in the set of excluded categories.

10. A system comprising:
one or more processors; and
one or more storage devices storing instructions that, when executed by the one or more processors, cause the one or more processors to perform operations comprising:
receiving, from a client device, a content request comprising a set of request signals specifying user group identifiers that each identify a user group that includes a user of the client device as a member;
identifying one or more user group identifiers that satisfy a first k-anonymity process;
transmitting, to each of one or more first content platforms, a selection parameter request comprising at least one of the one or more user group identifiers that satisfy the first k-anonymity process;
receiving, from the one or more first content platforms, selection parameter elements that each comprise data indicating a respective digital component and a selection parameter for the respective digital component;
transmitting, to a second content platform, one or more of the selection parameters and, for each selection parameter, data identifying the first content platform from which the selection parameter was received;
receiving, from the second content platform, data specifying a given first content platform selected based on the one or more selection parameters; and
transmitting, to the client device, data indicating the digital component provided by the given first content platform and the selection parameter for the digital component provided by the given first content platform.

11. The system of claim 10, wherein identifying one or more user group identifiers comprises selecting, as the one or more user group identifiers, each user group identifier that has been received from client devices including the client device at least a threshold number of times during a specified time period.

12. The system of claim 10, wherein the request signals further comprise contextual signals, the operations further comprising:
identifying one or more contextual signals that satisfy a respective k-anonymity process; and
providing the one or more contextual signals with the selection parameter request.

13. The system of claim 10, wherein transmitting, to each of one or more first content platforms, a selection parameter request comprising at least one of the one or more user group identifiers that satisfy the first k-anonymity process comprises transmitting, to each of the one or more first content platforms, a separate selection parameter request for each of the one or more user group identifiers.

14. The system of claim 10, wherein transmitting one or more of the selection parameters to a second content platform comprises:
identifying a set of the selection parameters that satisfy a second k-anonymity process; and
transmitting, as the one or more selection parameters, the set of selection parameters that satisfy the second k-anonymity process.

15. The system of claim 10, wherein:
the client device transmits a second content request to the second content platform;
the second content request comprises the selection parameter for each selected digital component and contextual signals; and
the second content platform selects a given digital component for presentation at the client device from among a set of digital components comprising each selected digital component and one or more additional digital components identified based on the contextual signals independent of any of the user group identifiers.

16. The system of claim 10, wherein each selection parameter element comprises a creative element comprising the data indicating the respective digital component of the selection parameter element, wherein each creative element further comprises:
one or more categories for content of the respective digital component;
a unique identifier for a digital component provider that publishes the respective digital component; and
a digital signature generated for the creative element by the second content platform.

17. The system of claim 16, wherein transmitting one or more of the selection parameters to a second content platform comprises:
selecting a set of digital components based on the one or more categories of each creative element; and
transmitting, as the one or more selection parameters, the selection parameters for the selected set of digital components.

18. The system of claim 17, wherein selecting a set of digital components based on the one or more categories of each creative element comprises:
comparing the one or more categories of each creative element to a set of excluded categories for an electronic resource of a publisher for which content is being requested; and
selecting, for inclusion in the set of digital components, each digital component for which the one or more categories does not match any excluded category in the set of excluded categories.

19. A non-transitory computer readable medium carrying instructions that, when executed by one or more processors, cause the one or more processors to perform operations comprising:
receiving, from a client device, a content request comprising a set of request signals specifying user group identifiers that each identify a user group that includes a user of the client device as a member;
identifying one or more user group identifiers that satisfy a first k-anonymity process;
transmitting, to each of one or more first content platforms, a selection parameter request comprising at least one of the one or more user group identifiers that satisfy the first k-anonymity process;
receiving, from the one or more first content platforms, selection parameter elements that each comprise data indicating a respective digital component and a selection parameter for the respective digital component;
transmitting, to a second content platform, one or more of the selection parameters and, for each selection parameter, data identifying the first content platform from which the selection parameter was received;
receiving, from the second content platform, data specifying a given first content platform selected based on the one or more selection parameters; and transmitting, to the client device, data indicating the digital component provided by the given first content platform and the selection parameter for the digital component provided by the given first content platform.

20. The non-transitory computer readable medium of claim 19, wherein identifying one or more user group identifiers comprises selecting, as the one or more user group identifiers, each user group identifier that has been received from client devices including the client device at least a threshold number of times during a specified time period.

* * * * *